C. W. SALADEE.

TORSION-SPRING FOR VEHICLES.

No. 7,855. Reissued Aug. 21, 1877.

Witnesses:

Fred Benjamin.

Howard Jewell

Inventor

C. W. Saladee

By his atty

Charles E. Foster

N. PETERS, PHOTO-LITHOGRAPHER, WASHINGTON, D. C.

UNITED STATES PATENT OFFICE.

CYRUS W. SALADEE, OF WASHINGTON, DISTRICT OF COLUMBIA.

IMPROVEMENT IN TORSION-SPRINGS FOR VEHICLES.

Specification forming part of Letters Patent No. 132,695, dated October 29, 1872; Reissue No. 7,855, dated August 21, 1877; application filed July 18, 1877.

*To all whom it may concern:*

Be it known that I, CYRUS W. SALADEE, of Washington, District of Columbia, have invented certain new Improvements in Torsion-Springs, of which the following is a specification embodying my invention:

The nature of my present invention consists in the employment of angular rods or bars of steel for torsional springs, and in the peculiar construction and application of the same, as hereinafter more fully shown and described; and has for its object, first, greater strength to a given size of steel as compared with round rods; and, second, to simplify and cheapen the preparation of torsional rods ready for application.

Where an angular rod is reduced to a circular form to fit its bearing, if the torsional strength of the cross-area of the steel is calculated and relied upon, it would be found too weak at the point of the round bearing, and would then be strained out of its normal position or broken; but if the angular rod could be so applied as to maintain the flat faces throughou tits entire length, rods of this form would in all cases be preferable to round ones in every respect, greater strength would be secured, and the cost of manufacture greatly reduced; and the attainment of this object is the chief point of my invention.

Figure 1:
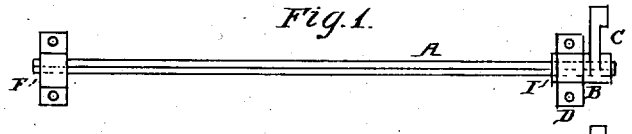
Figure 3:
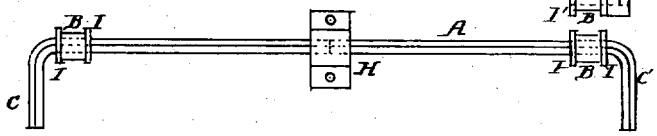
Figure 2:
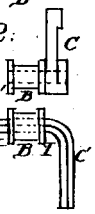

In the drawings, Figure 1 is a top view of the first modification of the angular spring. Fig. 2 is a side elevation of the crank seen in Fig. 1, showing the sleeve B made part of the crank. Fig. 3 is a top view of the second modification, and Fig. 4 is a top view of the third modification; and Fig. 5 is a side elevation of the "split box," in which the loose sleeve B finds its bearing, it being an enlarged view of these parts.

Figure 5:
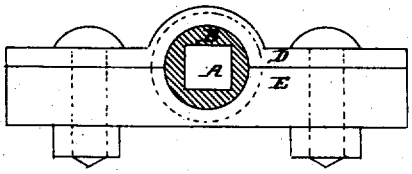

To obviate the objection above referred to, of turning the required round bearing at or near the lever ends of the angular rod, I provide a flanged sleeve, B, or its equivalent, of the requisite diameter to admit of passing the angular rod A through its center, and this cylindrical journal B rests in the split box D E, Figs. 1 and 5. So, also, the opposite end of the rod in Fig. 1 passes through the fixed bearing-plate, F, where it is rigidly held in position at that point, while the flanged sleeve B is permitted free action in its bearings.

It will thus be seen that positively no preparation or alteration of the uniform angle of the rod in Fig. 1, other than to cut off the required length and temper it, is required, and when cut off the proper length it is ready for application.

Figure 4:
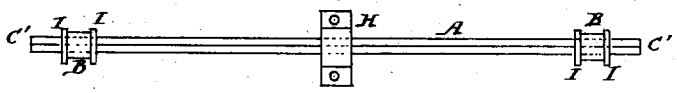

In Fig. 1 the sleeve or journal B is cast or formed solid with the crank C; but, if preferred, it is made separate from and independent of the crank, as in Figs. 3 and 4; and the lever arm or crank may either be formed out of the ends of the rod, as in Fig. 3, or a crank may be fitted to the square ends C′, Fig. 4, after passing through the sleeve B. Fig. 5 shows the sleeve B in section, with the outer flange I removed, while the inside flange is represented by the circular dotted line in position in its bearing, with a square hole pierced through its center, to receive the full size of the angular rod A.

In the first modification, Fig. 1, the rod extends its full length across to the bearing-plate F, where it is rigidly held, as before described. This gives greater torsional action than in the remaining two other modifications, by reason of its great length. When, however, such extended action is not required, the rod may have its bearings at each end, with a supplemental central attachment or bearing at H, from which the twist or torsional action extends in opposite directions to both ends whenever the cranks or the attachment H are turned to twist the longitudinal or torsional portion or member of the spring.

Apart from the simplicity and cheapness of the spring formed by bending the ends to form the lever-arms C, great strength is secured, as the welding or other modes of securing separate arms is always objectionable, and liable to imperfections, weakening the whole structure.

A most important feature of this construction is the placing of both arms at one side and bending or twisting the torsional portion from the center at H, thereby twisting the portions on opposite sides of the attachment in opposite directions with greater resistance than would otherwise result.

I will here state that it is my purpose to employ angular torsional springs on the plan of my invention in wheeled vehicles of every class and kind, and for other purposes where the same is applicable and desirable.

I claim as my invention—

1. A torsional spring composed of an angular rod of steel, of substantially uniform size and shape throughout the entire length, including the bearing, as and for the purpose set forth.

2. A torsional spring of angular steel, uniform in size and shape at the bearings with the body of the spring, or nearly so, and having a central attachment, from which the twist extends in opposite directions, substantially as set forth.

3. A torsional spring consisting of the central straight body A, extended to form the arms C at right angles to the body on the same side, and provided with a central attachment, secured immovably upon the spring, and from which the spring is twisted toward each end, substantially as set forth.

4. A torsional spring composed of an angular rod of steel extending through a cylindrical bearing, substantially as set forth.

5. The loose sleeve-bearing B, for supporting and operating angular torsional springs, substantially as and for the purpose set forth.

CYRUS W. SALADEE.

Witnesses:

CHARLES E. FOSTER,
FRED. BENJAMIN.